United States Patent [19]

Miyazaki et al.

[11] Patent Number: 4,851,904

[45] Date of Patent: Jul. 25, 1989

[54] MOTION DETECTING CIRCUIT FOR DIGITAL VIDEO SIGNAL

[75] Inventors: Toru Miyazaki, Yokohama; Kiyoyuki Kawai, Yokosuka, both of Japan

[73] Assignee: Kabushiki Kaisha Toshiba, Kawasaki, Japan

[21] Appl. No.: 167,188

[22] Filed: Mar. 11, 1988

[30] Foreign Application Priority Data

Mar. 17, 1987 [JP] Japan .................................. 62-61951

[51] Int. Cl.⁴ ............................................. H04N 7/18
[52] U.S. Cl. .................................... 358/105; 358/108; 358/21 R
[58] Field of Search ...................... 358/21 R, 105, 108, 358/138

[56] References Cited

U.S. PATENT DOCUMENTS

| | | | |
|---|---|---|---|
| 4,218,703 | 8/1980 | Netravali et al. | 358/105 |
| 4,307,420 | 12/1981 | Ninomiya et al. | 358/105 |
| 4,626,891 | 12/1986 | Achiha | 358/21 R |
| 4,736,252 | 4/1988 | Nakagawa et al. | 358/105 |

FOREIGN PATENT DOCUMENTS 62-175093 7/1987 Japan .

OTHER PUBLICATIONS

NEC Technical Journal, vol. 37, No. 4/1984, The Enhanced Definition Digital Television by Non-Interlace Scanning.

1984 July National Convention Record of the Institute of Television Engineers of Japan.

Primary Examiner—James J. Groody
Assistant Examiner—John K. Peng
Attorney, Agent, or Firm—Cushman, Darby & Cushman

[57] ABSTRACT

A frame memory stores one-frame data of an input digital video signal and outputs the stored data as a one-frame delayed digital video signal. A first motion data generator receives the input digital video signal and the one-frame delayed digital signal from the frame memory and generates first motion data in accordance with the difference between these two signals. A data compander receives the one-frame delayed digital video signal from the frame memory, compands the data amount of the one-frame delayed digital video signal, and ououts the resultant signal. A sub-frame memory stores the output signa from the data compander and outputs the stored data as a two-frame delayed signal. A data expander receives the two-frame delayed output signal from the sub-frame memory, expands the two-frame delayed output signal to the original data amount, and outputs the resultant signal. A second motion data generator receives the input digital video signal and the two-frame delayed signal from the data expander, and generates second motion data in accordance with the difference between the two signals.

14 Claims, 8 Drawing Sheets

MOTION DETECTING CIRCUIT FOR DIGITAL VIDEO SIGNAL

BACKGROUND OF THE INVENTION

1. Field of the Invention

This invention relates to a motion detecting circuit for a digital video signal and, more particularly, to a motion detecting circuit used in a Y/C separator for separating a digital color video signal into the chrominance signal (C) and the luminance signal (Y).

2. Description of the Related Art

In order to improve image quality of a television picture, signal processing of a digital system has been recently performed in addition to a conventional analog processing upon detection of a video signal. Any existing composite color television signal is transmitted by multiplexing the luminance signal (to be referred to as the Y signal hereinafter) with the chrominance signals (to be referred to as the C signal hereinafter). For this reason, similar to the analog processing, a circuit for separating these two types of signal components is required in a digital processing section in a receiver side. Currently, a comb filter capable of separating signals without degrading a horizontal resolution is widely used as such a separating circuit. However, in such a comb filter, if a high-frequency component in a vertical direction is present because the C signal has low correlation in the vertical direction, this component may be mixed in the Y signal, thereby causing a color disturbance called dot interference on a monitor screen.

In the NTSC signal compared with the phase of the C signal of a current frame, that of the C signal of the immediately preceding frame is inverted. Therefore, there is provided a technique for the Y/C separator wherein the C signal can be obtained from the difference between the signals of the current frame and the immediately preceding frame, whereas the Y signal can be obtained from the sum of the signals. According to this technique, the C and Y signals can be obtained regardless of correlation of image in the vertical direction, without causing the above-described interference.

However, according to this technique, in a still image portion, the above two signals can be completely separated, whereas in a motion image portion, incomplete separation is caused.

In order to prevent such a trouble, a technique using a motion detecting type filter having two separating circuits has been developed. According to this technique, the motion adaptive type filter detects motion of the image and switches the separating circuits to be suitably used for the still and motion image portions, respectively.

In this technique, first motion data is obtained from the difference between digital video signals of adjacent frames, and second motion data is obtained from the difference between digital video signals of every other frame. The first and second data are used for obtaining a motion detection signal varying in accordance with the motion of a digital video signal (image). By performing Y/C separation using this motion detection signal obtained in this manner, complete Y/C separation can be performed for the motion image portion as well as the still image portion.

However, in order to obtain the second motion data, the motion detecting circuit according to the above idea requires two frame memories, each having a memory capacity of one frame, i.e., a large memory having a capacity of two frames, as a whole. Therefore, it costs a great deal to realize the motion detecting circuit according to this idea. In addition, a large quantity of hardware is required to realize an IC as a digital TV system by utilizing this motion detecting circuit.

SUMMARY OF THE INVENTION

It is, therefore, an object of the present invention to provide a new and improved motion detecting circuit for a digital video signal which can be realized at low cost by reducing the capacity of a frame memory required for motion detection without degrading its performance upon application.

According to the present invention, there is provided a motion detecting circuit for a digital video signal, said circuit comprising:

frame memory means for storing one-frame data of an input digital video signal and outputting the stored data as a one-frame delayed digital video signal;

first motion data generating means for receiving the input digital video signal and the one-frame delayed digital signal from the frame memory means, and generating first motion data in accordance with the difference between these signals;

data commanding means for receiving the one-frame delayed digital video signal from the frame memory means, commanding a data amount of the one-frame delayed digital video signal, and outputting the resultant signal sub-frame memory means for storing the output signal from the data companding means and outputting the stored data as a two-frame delayed signal;

data expanding means for receiving the two-frame delayed output signal from the sub-frame memory means, expanding the two-frame delayed output signal to the original data amount, and outputting the resultant signal; and second motion data generating means for receiving the input digital video signal and the two-frame delayed signal from the data expanding means, and generating second motion data in accordance with the difference between these signals.

BRIEF DESCRIPTION OF THE DRAWINGS

These and other objects and features of the present invention can be understood through the following embodiments by reference to the accompanying drawings, in which.

DETAILED DESCRIPTION OF THE PREFERRED EMBODIMENTS

A digital system of a digital TV set, to which an embodiment of the present invention is applied, will be generally described below with reference to FIG. 1.

Figure 1:
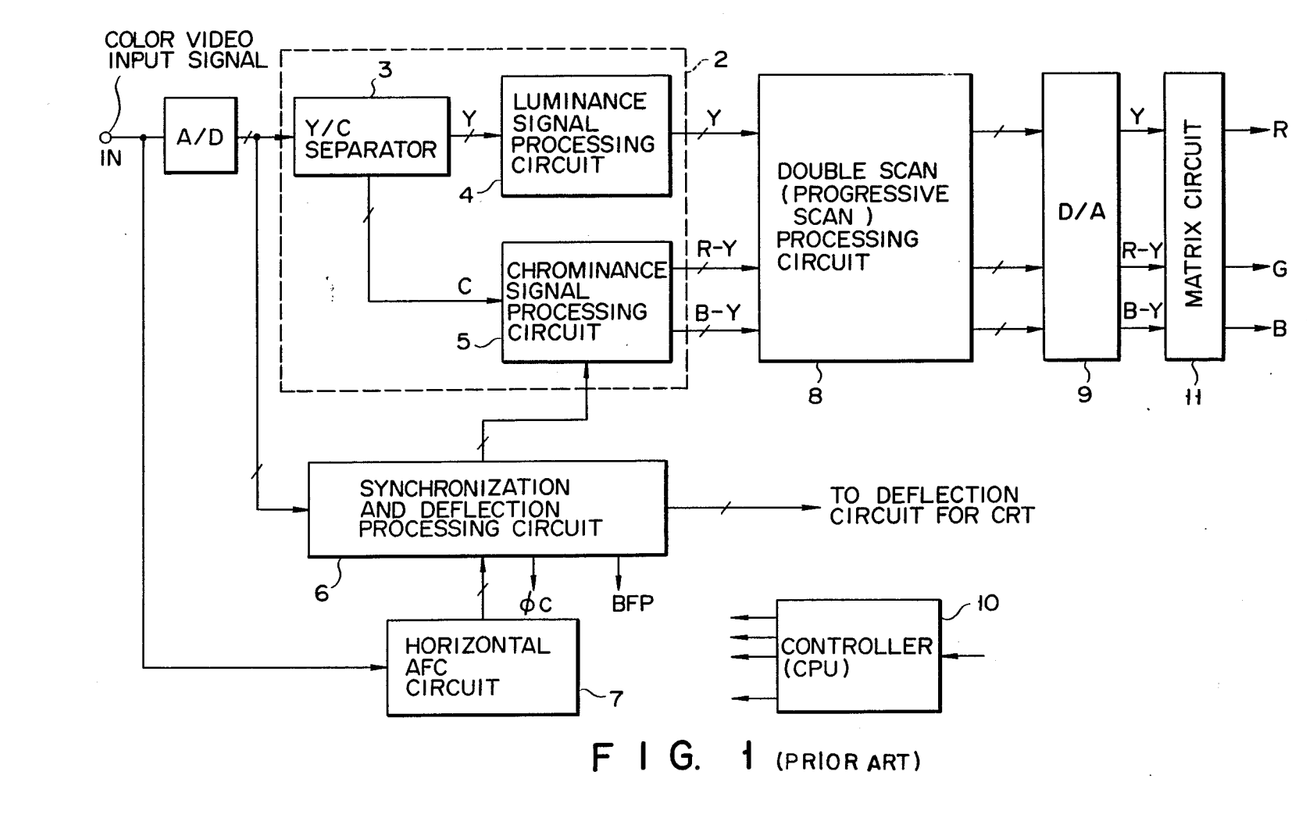
FIG. 1 is a block diagram showing a main part of a digital TV system to which the present invention is applied.

As shown in FIG. 1, an analog video signal supplied to input terminal IN is converted into a digital video signal by A/D converter 1. A/D converter 1 samples an analog video signal using clock signal 4fsc (fsc: color subcarrier frequency) which is synchronized with a burst signal and outputs a digital video signal having a quantized value of 8 bits. Y/C separator 3 separates this digital signal into the Y (luminance signal) component and the C (chrominance signal) components. Y/C separator 3 aims to obtain the Y and C signals free of cross color interference, which is caused when the luminance signal is mixed in the chrominance signal. For this purpose, Y/C separator 3 uses the above-described motion adaptive type filter. In this case, it is required to use a motion detecting circuit capable of minimizing a necessary memory capacity.

The Y signal output from Y/C separator 3 is processed by luminance signal processing circuit 4, wherein horizontal/vertical edge emphasis and Y nonlinear processing are mainly performed. For the purpose of edge emphasis, luminance signal processing circuit 4 includes a digital filter for extracting an edge from the Y signal and a pipelined multiplier having e.g., 8×4, or 8×3 bits for adjusting a gain of the extracted signal and adding the resultant signal to the original Y signal. Additionally, in order to provide the Y nonlinear characteristic to the Y signal, luminance signal processing circuit 4 includes a pipelined multiplier having, e.g., 8×4 bits and an adder.

The C signal output from Y/C separator 3 is processed by chrominance signal processing circuit 5 and subjected to bandpass filter processing, matrix color demodulation processing, ACC (Automatic Color Control) processing, and color killer processing. For this purpose, chrominance signal processing circuit 5 includes a digital bandpass filter for removing an unnecessary Y component from the C signal, and a pipelined multiplier having, e.g., 9×9 bits and serving as a matrix color demodulation circuit for adjusting the hue, color saturation, and the like of the C signal upon removal of the unnecessary Y component so as to obtain color difference signals R-Y and B-Y. In addition, chrominance signal processing circuit 5 includes a color killer circuit, a matrix circuit, and an ACC circuit which cooperates with a multiplier to reliably perform color reproduction.

Y/C separator 3, luminance signal processing circuit 4, and chrominance signal processing circuit 5 are formed into an IC including video signal processing circuit 2.

The digital video signal from A/D converter 1 is also supplied to synchronization and deflection processing circuit 6, which is formed in an IC, because the color demodulation i chrominance signal processing circuit 5 need be controlled in synchronism with a phase of clock 4fsc For this purpose, synchronization and deflection processing circuit 6 includes a phase locked loop (PLL) for generating color sync signal $\phi c$ and burst gate signal BFP. Further, in order to function as a CRT deflection circuit, circuit 6 includes a vertical synchronization circuit for obtaining a vertical sync detection signal from the digital video signal, and a horizontal synchronization circuit for obtaining a horizontal drive pulse on the basis of an output from horizontal AFC circuit 7.

In order to obtain a high image quality, luminance signal Y, and color difference signals R-Y and B-Y from video signal processing circuit 2, which is formed in an IC, are supplied to double scan (progressive scan) processing circuit 8, which is formed in a IC by a plurality of chips including field and line memories. As is well known, scan processing circuit 8 doubles the amount of scanning lines in an image (interlaced scanning noninterlaced scanning) to improve its vertical resolution and minimize the unsteady flickering (so-called line flicker) on the screen. In the case of the progressive scan processing circuit, as is well known, three-dimensional processing is performed using horizontal components, vertical components, and time as follows. In a motionless picture area, interpolated scanning lines are formed using picture elements of the immediately preceding field, whereas in a picture area encorporating motion, interpolated scanning lines are formed using picture elements of the adjacent scanning lines of one field, thereby finely performing motion detecting processing of each picture element.

After the scan processing for high image quality is applied to signals Y, R-Y, and B-Y, those signals are respectively converted by D/A converter 9 into analog signals and then converted by matrix circuit 11 into the R, G, and B signals.

Note that reference numeral 10 in FIG. 1 denotes a controller (CPU) for supplying the clocks and timing signals required for processing in each circuit described above.

The present invention relates to an improvement in a motion detecting circuit used in Y/C separator 3 included in integrated video signal processing circuit 2 of the digital TV system described above.

Prior to the description of the embodiment according to the present invention, a conventional technique will be described.

Figure 2:
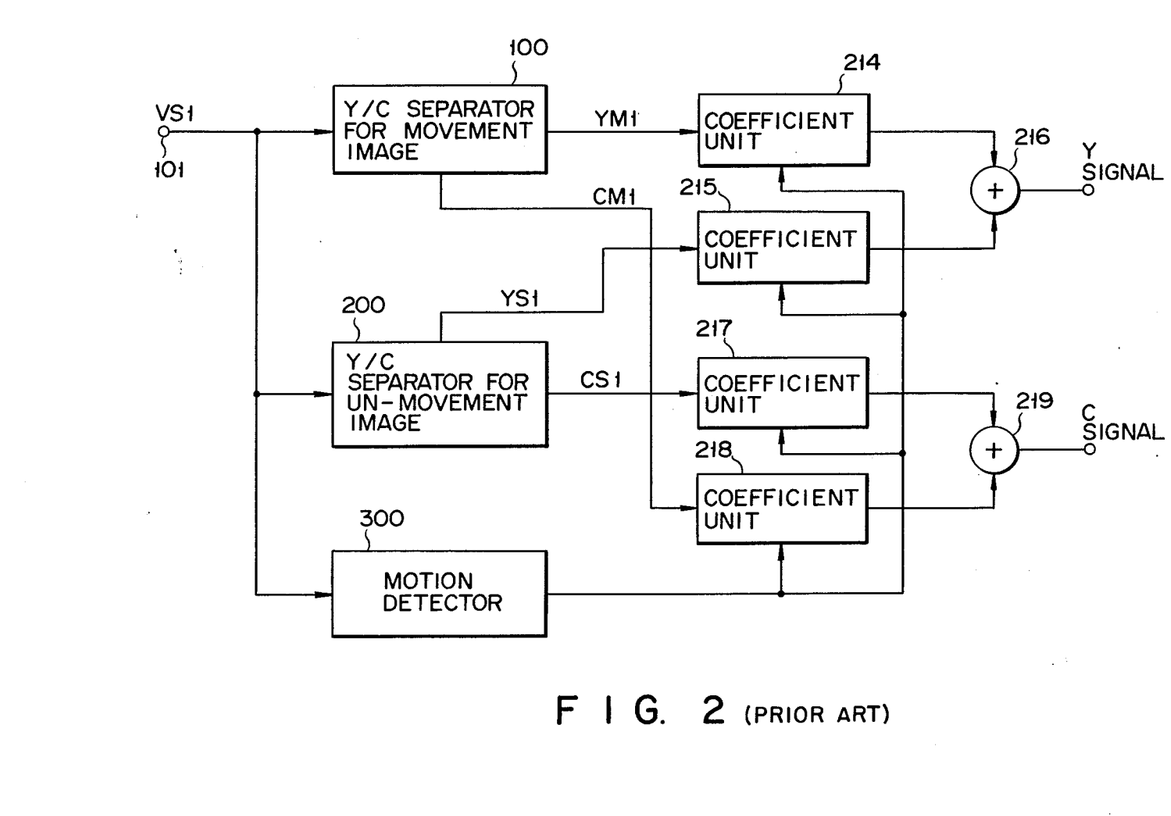
FIG. 2 is a block diagram of a Y/C separator in FIG. 1 realized by utilizing a motion detecting type filter.
Figure 3:
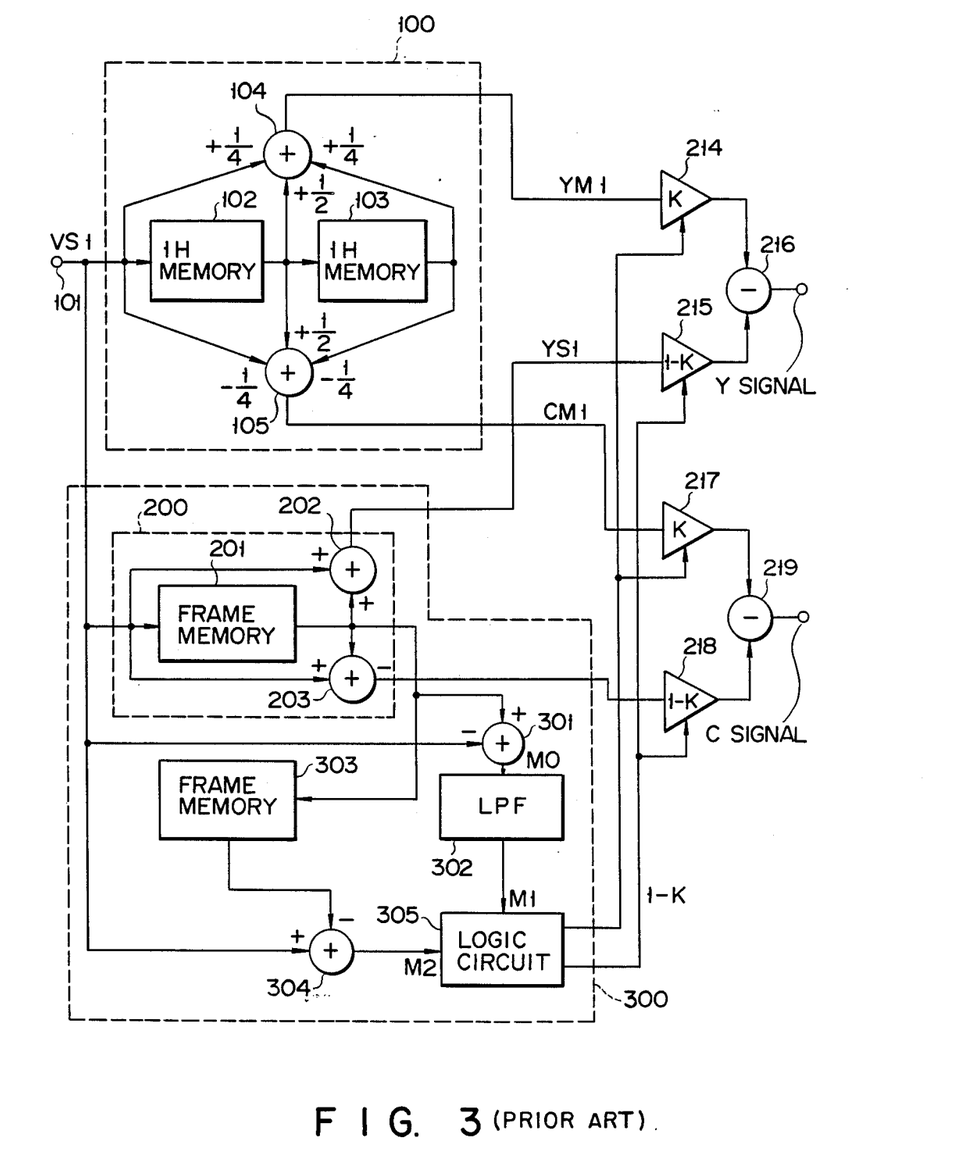
FIG. 3 is a block diagram of a conventional circuit showing the Y/C separator of FIG. 2 in detail.
Figure 4A:
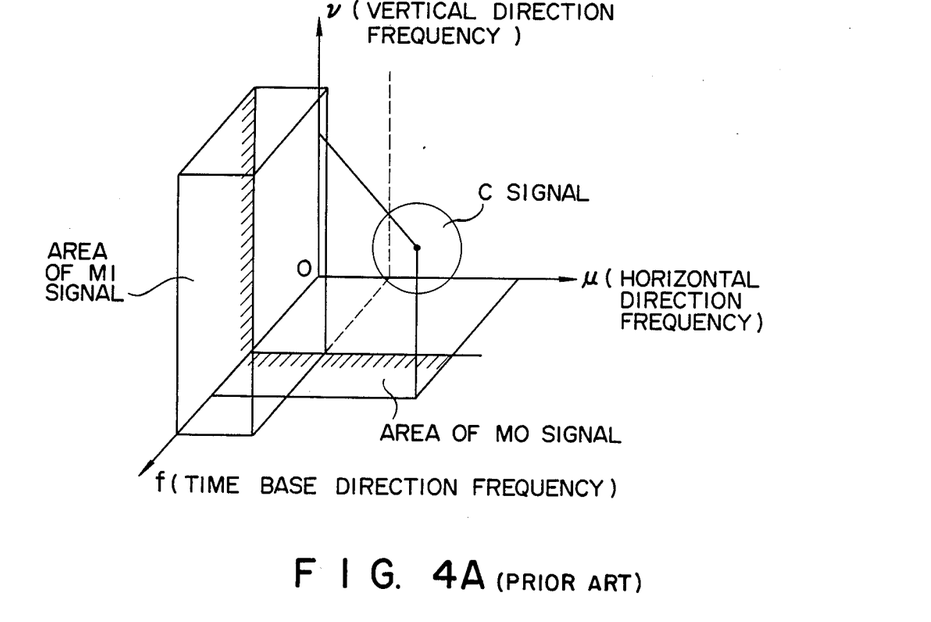
FIGS. 4A and 4B are graphs for explaining an operation of the circuit in FIG. 3.
Figure 4B:
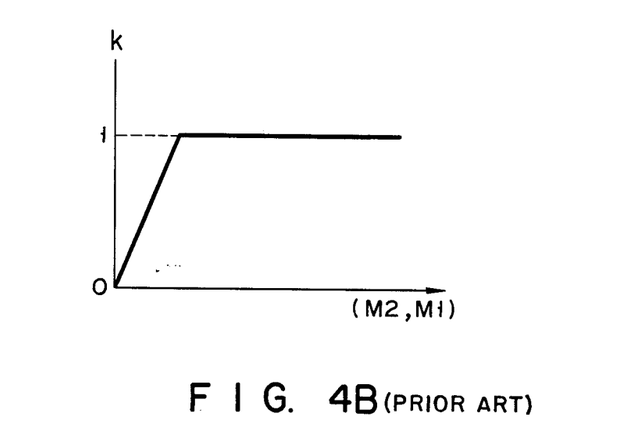

FIG. 2 is a schematic view showing an arrangement of a conventional detecting type separation filter. FIG. 3 shows a circuit of the detecting type separation filter in detail. FIGS. 4A and 4B are graphs showing the characteristics of a motion detector of FIGS. 2 and 3. FIGS. 2 and 3 correspond to one another. Since FIG. 3 shows the circuit in more detail, FIG. 3 will be referred to below.

Digital video signal VS1 of the NTSC system is supplied to terminal 101. Digital video signal VS1 is introduced to Y/C separator 100 for motion image, Y/C separator 200 for still image, and motion detector 300.

Figure 5A:
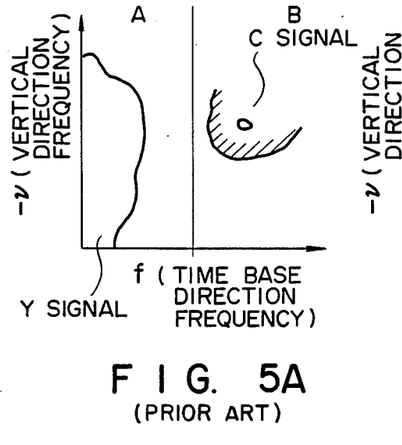
FIGS. 5A, 5B, 6A, and 6B are graphs of frequencies for explaining an operation of a motion detecting Y/C separator.

Y/C separator 200 for still image extracts C signal component CS1 by obtaining the value difference between pixels of a current frame and the immediately preceding frame using frame memory 201, and adders 202 and 203. In addition, Y/C separator 200 for still image, extracts Y signal component YS1 by obtaining the sum of the pixels. FIG. 5A shows the frequency characteristics of the C and Y signal components. As shown in FIG. 5A, with respect to the Y signal component, the C signal components are present in a high-frequency range in the time base direction frequency (to be referred to as the f-axis hereinafter). For this reason, frame memory 201 and adder 202 constitute a low-pass filter on the f-axis (in area A in FIG. 5A), whereas frame memory 201 and adder 203 constitute a high-pass filter on the f-axis (in area B in FIG. 5A).

Figure 5B:
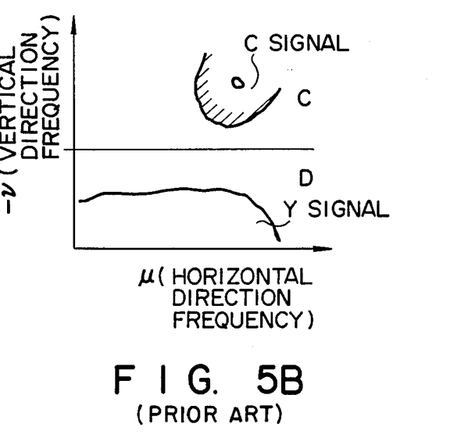

In Y/C separator 100 for motion image, 1H (H: horizontal period) memories 102 and 103, and adders 104 and 105 constitute a filter having frequency characteristics such as that shown in FIG. 5B. This separator obtains C signal component CM1 by determining the difference between pixels in the vertical direction, and obtains Y signal component YM1 from the sum of the pixel values by utilizing the fact that every line of the phase of the C signal is inverted. As shown in FIG. 5B, with respect to the Y signal, the C signal is present in a high-frequency range in the vertical direction frequency (to be referred to as the $\nu$-axis hereinafter). For this reason, line memories, i.e., 1H memories 102 and 103, and adder 104 constitute a low-pass filter on the $\nu$-axis (in area D in FIG. 5B). whereas 1H memories 102 and 103, and adder 105 constitute a high-pass filter on the $\nu$-axis (in area C in FIG. 5B).

Motion detector 300 will be described below. Motion detector 300 includes Y/C separator 200 for still image. In order to perform motion detection, careful consideration is given to the fact that a pixel located at a given position of a current pixel of a composite TV signal (digital video signal) is again monitored at the given position one frame after. The time difference between the two pixels is 1/30 of a second. Therefore, motion data M0 can be obtained by calculating the difference between pixels of adjacent frames using frame memory 201 and adder 301.

However, as described above, in a composite TV signal, the phase of a chrominance signal is inverted. For this reason, a high-pass filter is constituted in the f-axis direction, in order to obtain the difference between frames. Thus, as shown in FIG. 4A, a large C signal is also included other than motion data. Therefore, the C signal is passed through low-pass filter 302 for the horizontal direction frequency (to be referred to as the $\mu$-axis hereinafter) in order to remove this chrominance signal, thereby obtaining accurate first motion data M1. However, motion data of a high-frequency range in the $\mu$-axis direction is omitted from the first motion data M1, and especially the motion of the chrominance signal is no longer detected.

Therefore, it should be noted that in a composite TV signal of the HTSC system, the phase of a chrominance signal of a current pixel coincides with that of a chrominance signal of a pixel which is two frames ahead of the current frame, and the difference in time between the pixels is 1/15 of a second. Second motion data M2 is obtained by calculating the difference between the pixels of every other frame using frame memory 303 and adder 304. Then, first and second motion data M1 and M2 are supplied to logic circuit 305 and subjected to an appropriate digital operation to obtain motion detection signals K and $1-K$.

FIG. 4B shows a digital operation in logic circuit 305.

Gains of coefficient units 214, 215, 217, and 218 are controlled in accordance with the levels of the motion detection signals K and $1-K$, and the Y and C signals are respectively obtained from adders 216 and 219. That is, the mixing ratio control is performed for Y signal components YM1 and YS1, and for C signal components CM1 and CS1, which are all obtained by Y/C separator 100 and Y/C separator 200.

Figure 6A:
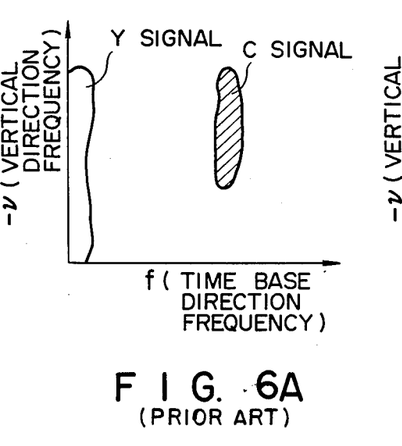
Figure 6B:
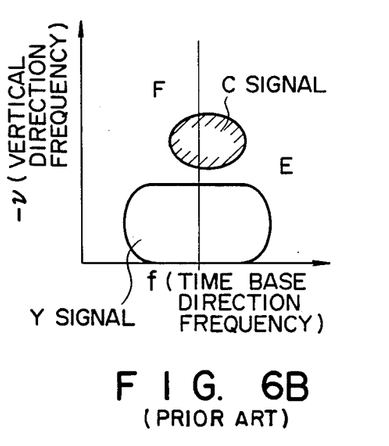

More specifically, when motion detector 300 determines that the Y and C signals represent a still image, both the signals do not expand much on the f-axis because they are motionless, i.e., the Y and C signals are not present in a high-frequency range on the f-axis, as shown in FIG. 6A. Therefore, the Y and C signals can be separated from each other by Y/C separator 200 using areas A and B as shown in FIG. 5A When it is determined that the Y and C signals represent a motion image, as opposed to that of the above case, both the signals are present in a high-frequency range on the f-axis, as shown in FIG. 6B. Therefore, if the signals are separated by Y/C separator 200 having the characteristic shown in FIG. 5A, the C signal in area F leaks on the Y signal side, and the Y signal in area E leaks on the C signal side, as shown in FIG. 6B. This causes a blur or an after image on a screen. In this case, therefore, separation of the Y and C signals is performed by Y/C separator 100 having the characteristic shown in FIG. 5B.

According to the above-described conventional technique, as shown in FIG. 3 in detail, a large memory having a two frame capacity is required to obtain motion detecting data. For this reason, it costs a great deal to realize a motion detecting circuit and a digital TV system in its entirely. In addition, it is difficult to form them into an IC.

An embodiment of the present invention which can eliminates the above-mentioned conventional drawbacks will be described with reference to the accompanying drawings.

Figure 7:
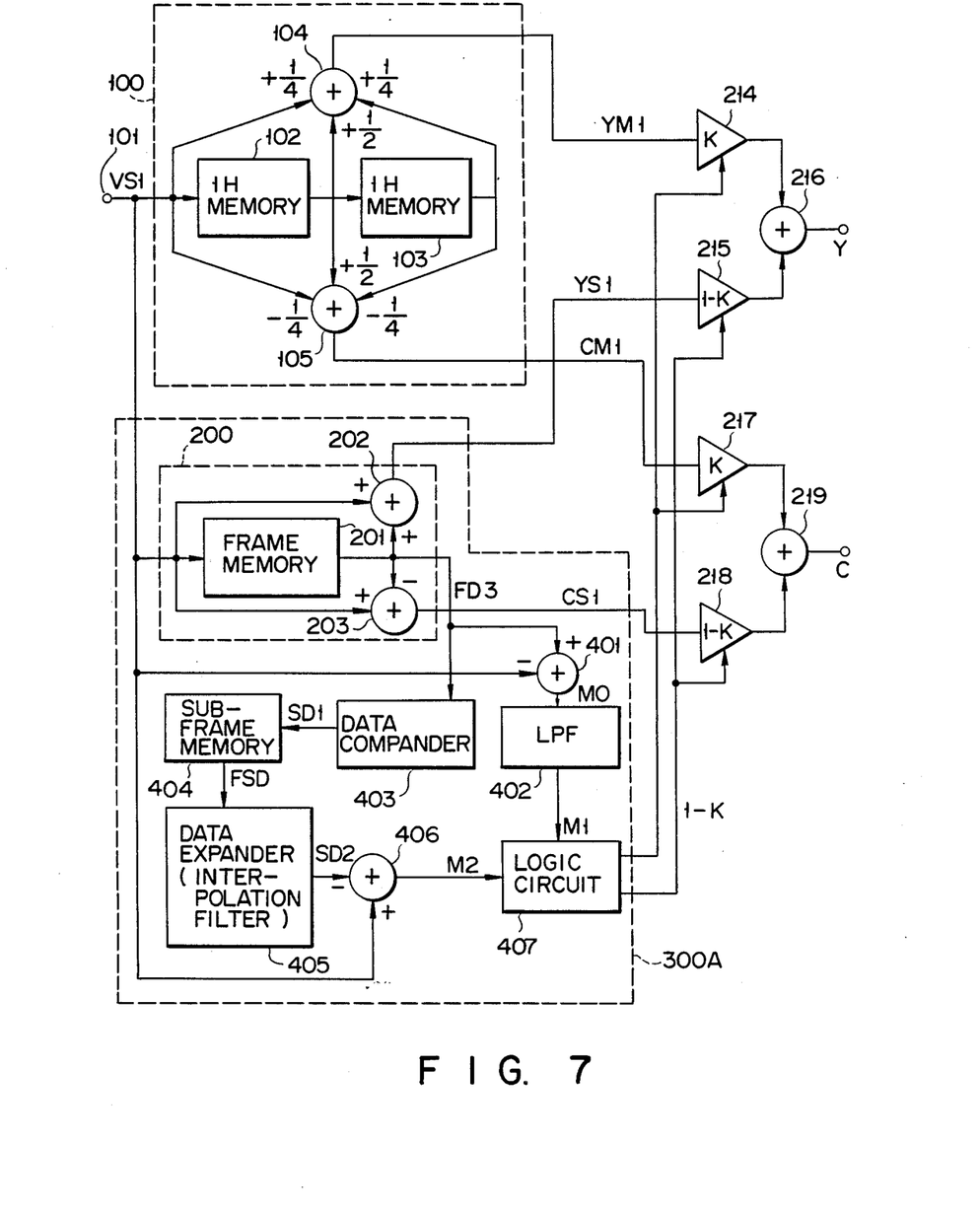
FIG. 7 is a circuit diagram of a motion detecting circuit for digital video signal according to an embodiment of the present invention.

FIG. 7 shows an embodiment of the present invention, which is applied to a motion adaptive type Y/C separator. The same reference numerals in the embodiment denote the same parts as in the above-described circuit of FIG. 3.

Digital video signal VS1 of the NTSC system is supplied to terminal 101. Video signal VS1 is introduced into Y/C separator 100 for motion image, Y/C separator 200 for still image, and a motion detector 300A.

Similar to the case of FIG. 3, in Y/C separator 200 for still image, C and Y signal components CS1 and YS1 are respectively extracted by obtaining the value difference between the pixels of adjacent frames and the sum thereof using frame memory 201, and adders 202 and 203. Extracted signals components CS1 and YS1 have the same frequency characteristics as those shown in FIG. 5A.

Similar to the case in FIG. 3, in Y/C separator 100 for motion image, 1H (H: horizontal period) memories 102 and 103, and adders 104 and 105 constitute a filter having the frequency characteristics shown in FIG. 5B. As described above, separator 100 can respectively obtain C and Y signal components CM1 and YM1 by respectively obtaining a difference between pixels in the vertical direction and a sum thereof by utilizing the fact that the phase of the C signal is inverted every line.

Motion detector 300A, which is a main feature of the present invention, will be described below.

According to the present invention, output signal FD3 from frame memory 201 is also supplied to data compander 403 and adder 401.

The path constituted by adder 401 and low-pass filter 402 will be described. Adder 401 subtracts a current pixel at input terminal 101 from a pixel of immediately preceding frame to obtain motion data M0. As described above, in this case, since the difference in output between the frames includes a large C signal other than the motion data, the C signal is removed by low-pass filter 402, thereby obtaining first motion data M1 (refer to FIG. 4A).

Next, the path constituted by data compander 403, sub-frame memory 404, data expander 405, and adder 406 will be described.

In practice, data compander 403 is constituted by a sub-sample circuit. Data compander 403 sub-samples output signal FD3 from frame memory 201 to generate signal SD1 having a low data level, and supplies it to sub-frame memory 404. Note that for the sub-sample circuit, a circuit may be used, which performs sub-sampling using a signal having a frequency of ½ the clock rate of data as a clock for latching. Sub-frame memory 404 functions as a delay element for establishing a relationship such that self output signal FSD is delayed by one frame with respect to input signal SD1. Output signal FSD is supplied to data expander 405. Data expander 405 is constituted by an interpolation filter, and generates signal SD2 by expanding the data which has been companded by data compander 403.

Figure 8:
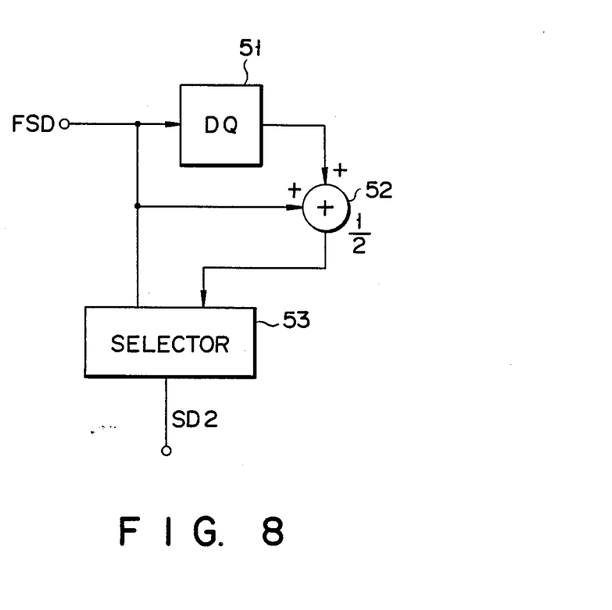
FIG. 8 is a circuit diagram showing a data expander of FIG. 7 in detail.

FIG. 8 shows data expander 405 in detail. Signal FSD is supplied to unit delay element 51, adder 52, and selector 53.

Adder 52 also receives an output from unit delay element 51, and supplies an addition output to selector 53. Consequently, selector 52 can obtain interpolated signal SD2 by alternately selecting signal FSD and the output from adder 52. Adder 52 reproduces the data which has been lost upon sub-sampling by calculating a mean of data before and after the lost data.

The difference in time between signal SD2 obtained in this manner and signal VS1 at terminal 101 corresponds to two frames. By obtaining the difference between signals SD2 and VS1 using adder 406, second motion data M2 can be obtained from the difference corresponding to two frames. Note that the second motion data includes motion data in a high-frequency range in the $\mu$-axis (refer to FIGS. 4A and 9).

Figure 9:
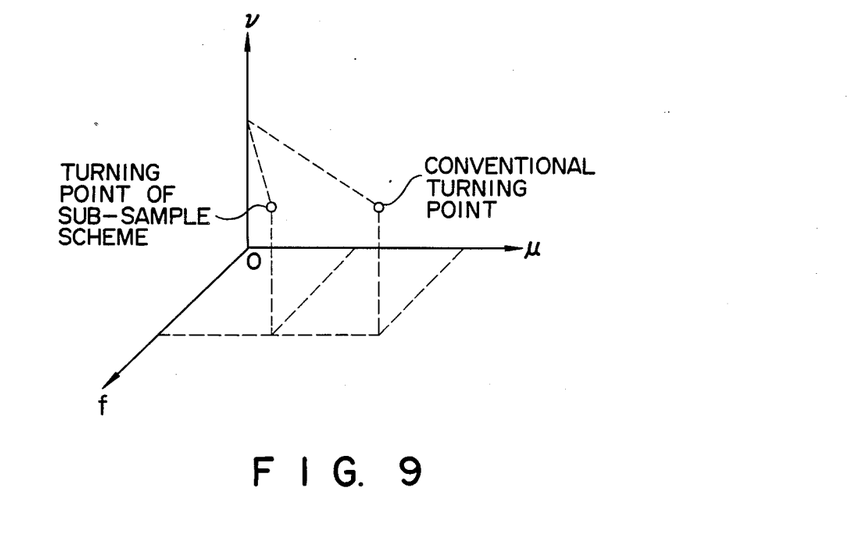
FIG. 9 is a graph for explaining an operation of the circuit in FIG. 7.

As shown in FIG. 9, a turning point appears on the $\mu$-axis at a frequency of ½ that of a conventional turning point upon sub-sample processing. Then, signals having frequencies higher than this frequency become turning components. However, in this case, the new turning point varies only on the $\mu$-axis, but does not vary on the f-axis, as shown in FIG. 9. To obtain the difference between two frames is to perform an operation on the f-axis. Therefore, data for detecting motion is not especially influenced, and hence accurate detection of motion can be obtained.

First and second motion data M1 and M2 obtained in the above-described manner are supplied to logic circuit 407 and subjected to a digital operation. As described in FIG. 3, motion signals K and 1—K obtained in this manner are used by coefficient units 214, 215, 217, and 218 as gain control data. With this operation, a motion detecting luminance signal and a motion detecting chrominance signal are separately output at the output terminals of adders 216 and 219, respectively.

As described above, the present invention can be realized at low cost by greatly reducing the capacity of a frame memory using data compander 403, sub-frame memory 404, and data expander 405 as the signal processing path for obtaining motion data, especially second motion data M2 without changing the characteristics of Y/C separation.

Note that in the above arrangement, for the sub-sample circuit serving as data compander 403, a circuit may be employed, which performs data band width compression on the basis of a known sub-Nyquist transmission (sub-offset sampling) method. In this case, the interpolation filter (circuit) serving as data expander 405 is preferably a circuit for generating an interpolation signal from signals of radial points having higher correlation and centered on an interpolation point.

Figure 10:
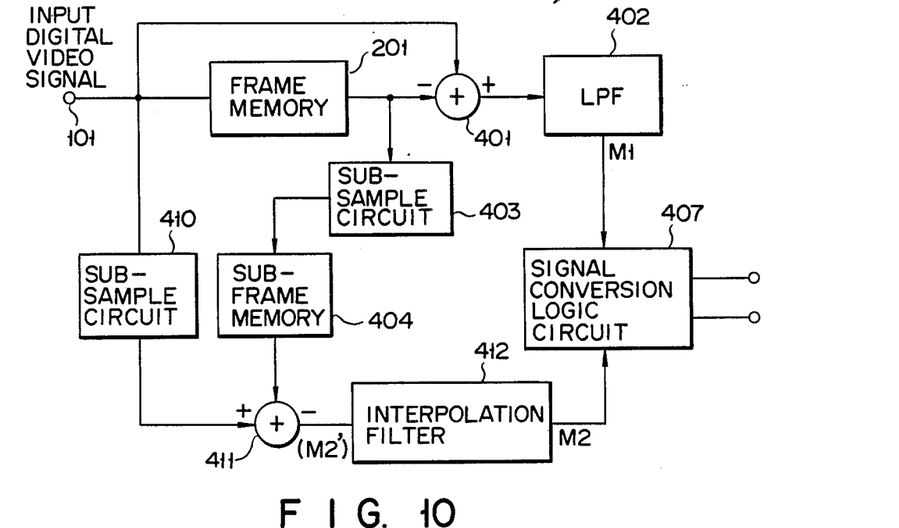
FIGS. 10 and 11 are circuit diagrams showing other embodiments according to the present invention.

FIG. 10 shows another embodiment of the present invention. The same reference numerals in FIG. 10 denote the same parts as in the embodiment of FIG. 7. In this embodiment, only a motion detecting section is shown and other parts are omitted. First, video signal VS1 is supplied to terminal 101. In this case, data M1 about the motion of a low-frequency component in the $\mu$-axis direction is obtained by frame memory 201, adder 401, and low-pass filter 402. Then, an output signal from frame memory 201 and the input video signal are respectively sampled by sub-sample circuits 403 and 410, and are data-companded. An output from sub-sample circuit 403 is supplied to next sub-frame memory 404. As described in FIG. 1, sub-frame memory 404 functions as a delay element for establishing a relationship between pixels such that a self output signal is delayed by one frame with respect to an output signal from sub-sample circuit 410. Second motion data M2' is obtained by calculating the difference between the output signals from sub-frame memory 404 and sub-sample circuit 410 in adjacent frames using adder 411. This calculation result is interpolated by interpolation filter 412 and the data sub-sampled in the preceding step is expanded, thereby obtaining motion signal M2 having the difference between signals of every other frame and including data about the motion of a high-frequency component on the $\mu$-axis. Subsequently, coefficients K and 1—K to be actually supplied to a mixer can be obtained by motion signal conversion logic circuit 407 on the basis of signals M1 and M2.

Unlike in the previous embodiment, according to the above embodiment, turning of signals does not occur in the f-axis direction, and signals of current frame and of the two frames ahead are data-companded under the same condition. As a result, turning of the output signals from sub-frame memory 404 and sub-sample circuit 410 are caused in the same manner. Therefore, only complete data about the motion can be extracted by obtaining the difference between these two signals using adder 411.

Figure 11:
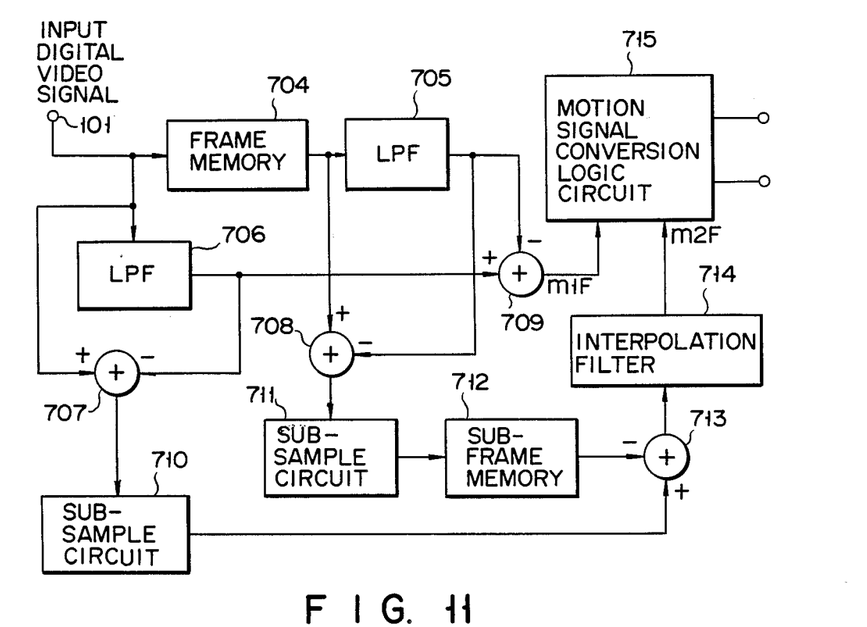

FIG. 11 shows still another embodiment. Similar to FIG. 10, FIG. 11 shows only a motion detecting section. First, a digital video signal is supplied to terminal 101. Then, data m1F about the motion of a low-frequency component in the $\mu$-axis direction is obtained by frame memory 704, low-pass filters 705 and 706, and adder 709. Adder 708 calculates the difference between outputs from frame memory 704 and low-pass filter 705, and then only a signal of high-frequency component in the $\mu$-axis direction is extracted. Similarly, only a high frequency component in the $\mu$-axis direction is extracted from the video signal by low-pass filter 706 and adder 707. The signals of high-frequency component in the $\mu$-axis direction extracted by adders 707 and 706 are respectively sub-sampled by sub-sample circuits 710 and 711. An output from sub-sample circuit 711 is input to sub-frame memory 712. Sub-frame memory 712 functions as a one-frame delay element in the same manner as in the sub-frame memory of FIG. 10. Therefore, the difference between the output signals from sub-frame memory 712 and sub-sample circuit 710 is obtained by adder 713, the resultant signal is interpolated by interpolation filter 714, and the data sampled in the previous step is interpolated, thereby obtaining only data about the motion of a high-frequency component on the μ-axis, i.e., motion signal m2F representing the difference between the signals of every other frame. Subsequently, coefficients K and 1−K to be actually supplied to a mixer can be obtained by motion signal conversion logic circuit 715 on the basis of signals m1F and m2F.

Similar to the previous embodiment, in the above embodiment, turning of signals does not occur on the f-axis, and signals of a current frame and of the two frames ahead are data-companded under the same condition. For this reason, if sub-sampling is used as a means for data-companding, as shown in FIG. 11, turning of the output signals from sub-frame memory 712 and sub-sample circuit 710 occurs at the same time. In addition, the two input signals to adder 713 include only signals of high-frequency component in the μ-axis direction after the processing by low-pass filters 705 and 706, and adders 707 and 708. In contrast to signal M2 shown in FIG. 10, which serves as a motion signal for high- and low-frequency ranges on the μ-axis, signal m2F serves as a complete motion signal for only a high frequency component on the μ-axis.

As has been described above, according to the present invention, when motion data is obtained by calculating the difference between a signal of digital video data in a current frame and a signal of the two frames ahead, at least a data compander for companding a data amount by sub-sampling and a sub-frame memory for delaying an output from the data compander are arranged in the path for introducing the signals to a adder for obtaining the difference between the signals by delaying the one-frame memory output by another frame. According to the present invention, in the path for sub-sampling, a frame memory having a memory capacity of one frame can be completely omitted, and hence hardware as a motion detecting circuit is greatly reduced, and a circuit arrangement suitable for an IC can be realized at low cost.

With the above arrangement, according to the present invention, there is provided a motion detecting circuit which can reduce the capacity of the frame memory and can be realized at low cost.

Thus, according to the present invention, there is provided a motion detecting circuit which can greatly reduce the capacity of the frame memory without degrading the characteristics of Y/C separation when applied to a Y/C separator.

What is claimed is:

1. A motion detecting circuit for a digital video signal, said circuit comprising:
   frame memory means for storing one-frame data of an input digital video signal and outputting the stored data as a one-frame delayed digital video signal;
   first motion data generating means for receiving the input digital video signal and the one-frame delayed digital signal from said frame memory means, and generating first motion data in accordance with a difference between these signals;
   data companding means for receiving the one-frame delayed digital video signal from said frame memory means, companding a data amount of the one-frame delayed digital video signal, and outputting a resultant signal;
   sub-frame memory means for storing the output signal from said data companding means and outputting the stored data as a two-frame delayed signal;
   data expanding means for receiving the two-frame delayed output signal from said sub-frame memory means, expanding the two-frame delayed output signal to an original data amount, and outputting a resultant signal;
   section motion data generating means for receiving the input digital video signal and said resultant signal from said data expanding means, and generating second motion data in accordance with a difference between both of the signals; and
   motion-detecting signal generating means for respectively receiving the first and second motion data from said first and second motion data generating means and generating a motion detection signal by performing a predetermined operation between the first and second motion data.

2. A circuit according to claim 1, wherein said first motion data generating means includes a low-pass filter for removing a chrominance signal component included in the input digital video signal.

3. A circuit according to claim 1, wherein said data companding means includes a sub-sample circuit.

4. A circuit according to claim 1, wherein said data expanding means includes an interpolation filter.

5. A circuit according to claim 4, wherein said interpolation filter includes a unit delay element, an adder, and a selector.

6. A motion detecting circuit for a digital video signal, said circuit comprising:
   frame memory means for storing one-frame data of an input digital video signal and outputting the stored data as a one-frame delayed digital video signal;
   first motion data generating means for receiving the input digital video signal and the one-frame delayed digital signal from said frame memory means, and generating first motion data in accordance with the difference between these two signals.
   first data companding means for receiving the input digital video signal, companding a data amount thereof and outputting a resultant signal;
   second data companding means for receiving the one-frame delayed digital video signal from said frame memory means, companding a data amount thereof, and outputting a resultant signal;
   sub-frame memory means for storing the output signal from said second data companding means and outputting the stored data as a two-framed delayed signal;
   second motion data generating means for receiving the output signal from said first data companding means and the two-frame delayed signal from said sub-frame memory means and generating second motion data which corresponds to a difference between the two signals;
   data expanding means for receiving the second motion data from said second motion data generating means, expanding the second motion data to an original data amount of the input digital video signal, and outputting a resultant signal; and
   motion-detecting signal generating means for receiving the first motion data generated by said first motion data generating means and the second motion data expand by said data expanding means and generating a motion detecting signal by performing a predetermined operation between the first and second motion data.

7. A circuit according to claim 6, wherein said first motion data generating means includes a low-pass filter for removing a chrominance signal component included in the input digital video signal.

8. A circuit according to claim 6, wherein each of said first and second data companding means includes a sub-sample circuit.

9. A circuit according to claim 6, wherein said data expanding means includes an interpolation filter.

10. A circuit according to claim 9, wherein said interpolation filter includes a unit delay element, an adder, and a selector.

11. A motion detecting circuit for a digital video signal, said circuit comprising:
frame memory means for storing one-frame data of an input digital video signal and outputting the stored data as a one-frame delayed digital video signal;
first low-pass filter means for filtering the one-frame delayed digital video signal from said frame memory means;
second low-pass filter means for filtering the input digital video signal;
first motion data generating means for receiving the output signals from said first and second low-pass filter means and generating first motion data in accordance with the difference between the two signals;
first synthesizing means for receiving the one-frame delayed digital signal from said frame memory means and the output signal from said first low-pass filter means and generating a first predetermined component signal;
second synthesizing means for receiving the input digital video signal and the output signal from said second low-pass filter means, and outputting a second predetermined component signal;
first data companding means for receiving the first predetermined component signal from said first synthesizing means, companding a data amount of the first predetermined component signal, and outputting a resultant signal;
second data companding means for receiving the second predetermined component signal from said second synthesizing means, companding a data amount of the second predetermined component signal, and outputting a resultant signal;
sub-frame memory means for storing the output signal from said first data companding means and outputting the stored data as a two-frame delayed signal;
second motion data generating means for receiving the output signal from said second data companding means and the two-frame delayed signal from said sub-frame memory means and generating second motion data which corresponds to a difference between both of the signals;
data expanding means for receiving the second motion data from said second motion data generating means, expanding the second motion data to an original data amount of the input digital video signal, and outputting a resultant signal; and
motion-detecting signal generating means for receiving the first motion data generated by said first motion data generating means and the second motion data from said second motion data generating means and generating a motion detection signal by performing a predetermined operation between the first and second motion data.

12. A circuit according to claim 11, wherein each of said first and second data companding means includes a sub-sample circuit.

13. A circuit according to claim 11, wherein said data expanding means includes an interpolation filter.

14. A circuit according to claim 13, wherein said interpolation filter includes a unit delay element, an adder, and a selector.

* * * * *